US012793664B2

(12) United States Patent
Jung et al.

(10) Patent No.: US 12,793,664 B2
(45) Date of Patent: Nov. 10, 2026

(54) DISPLAY DEVICE AND OPERATING METHOD THEREOF

(71) Applicant: LG ELECTRONICS INC., Seoul (KR)

(72) Inventors: Moongu Jung, Seoul (KR); Jinsin Park, Seoul (KR); Yongmin Jung, Seoul (KR); Jihye Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/000,488

(22) Filed: Dec. 23, 2024

(65) Prior Publication Data

US 2026/0024505 A1 Jan. 22, 2026

(30) Foreign Application Priority Data

Jul. 17, 2024 (KR) ........................ 10-2024-0094504

(51) Int. Cl.
*G09G 3/34* (2006.01)

(52) U.S. Cl.
CPC ... *G09G 3/3426* (2013.01); *G09G 2320/0257* (2013.01); *G09G 2320/064* (2013.01); *G09G 2320/066* (2013.01)

(58) Field of Classification Search
None
See application file for complete search history.

(56) References Cited

U.S. PATENT DOCUMENTS 9,468,065 B2 * 10/2016 Väänänen ............. G02F 1/1336
2009/0295841 A1 * 12/2009 Park ................... H05B 41/3927 315/297
2010/0277514 A1 11/2010 Yeo et al.
2011/0122168 A1 * 5/2011 Lee ...................... G09G 3/3426 345/102
2011/0128302 A1 * 6/2011 Cho ..................... G09G 3/3406 345/690
2012/0019160 A1 * 1/2012 Lee ........................ H05B 45/10 315/291
(Continued)

FOREIGN PATENT DOCUMENTS

EP 4 120 233 A1 1/2023
KR 10-2011-0068321 A 6/2011
KR 10-2022-0058369 A 5/2022

*Primary Examiner* — Matthew Yeung
(74) *Attorney, Agent, or Firm* — Birch, Stewart, Kolasch & Birch, LLP

(57) ABSTRACT

According to an embodiment of the present disclosure, a display device may comprise a liquid crystal display panel; a backlight configured to output a light to the liquid crystal display panel, wherein the backlight includes a plurality of backlight blocks and a light source driving circuit configured to generate a light source driving signal for controlling a light output of the backlight block, each backlight block has one or more LEDs (Light Emitting Diodes); and each LED is formed of KSF (Potassium fluorosilicate) phosphor; and a controller configured to: obtain a global dimming value and a local dimming value, determine a duty of the light source driving signal as the local dimming value if the global dimming value is less than a certain value, and reduce a constant current applied to the backlight block based on the global dimming value.

18 Claims, 19 Drawing Sheets

(56) References Cited

U.S. PATENT DOCUMENTS

| | | | | |
|---|---|---|---|---|
| 2014/0340000 | A1* | 11/2014 | Zhang | H05B 45/38 315/307 |
| 2015/0365621 | A1* | 12/2015 | Zhang | H04N 5/7408 348/791 |
| 2016/0276549 | A1* | 9/2016 | Yamashita | G02B 6/0091 |
| 2016/0330806 | A1 | 11/2016 | Yamashita et al. | |
| 2017/0039967 | A1* | 2/2017 | Jung | G09G 3/3648 |
| 2019/0064588 | A1 | 2/2019 | Lai et al. | |
| 2020/0135074 | A1* | 4/2020 | Wooster | G09G 3/006 |
| 2020/0301180 | A1 | 9/2020 | Iwamoto | |
| 2021/0065621 | A1* | 3/2021 | Lee | G09G 3/3208 |
| 2021/0074226 | A1* | 3/2021 | Ikeyama | G09G 3/3426 |
| 2023/0018404 | A1 | 1/2023 | Zen et al. | |
| 2024/0038181 | A1* | 2/2024 | Noami | G09G 3/36 |
| 2024/0105132 | A1 | 3/2024 | Le et al. | |

* cited by examiner (a)

(b)

(a)

(b)

(a)

(b)

| Operating frequency | Resolution | Operating method | Ref current | 1step current |
|---|---|---|---|---|
| 120Hz | 4096 step | PWM | 13mA | 0.003mA |
| 480Hz | 1024 step | PWM | 13mA | 0.013mA |

(a)

(b)

DISPLAY DEVICE AND OPERATING METHOD THEREOF

CROSS-REFERENCE TO RELATED APPLICATION

Pursuant to 35 U.S.C. § 119 (a), this application claims the benefit of earlier filing date and right of priority to Korea patent application 10-2024-0094504, filed on Jul. 17, 2024, the contents of which are all hereby incorporated by reference herein in its entirety.

BACKGROUND OF THE INVENTION

1. Field of the Invention

The present disclosure relates to a display device, and more specifically, to a display device having a liquid crystal display panel.

2. Discussion of the Related Art

Liquid crystal displays may be miniaturized compared to cathode ray tube (CRT), so they are used in display device such as portable information device, office equipment, and computer.

Transmissive liquid crystal display, which make up the majority of liquid crystal display device, displays image by controlling the electric field applied to the liquid crystal layer to modulate light incident from a backlight.

Recently, LED (Light Emitting Diode) using KSF (Potassium fluorosilicate) phosphor has been released as a backlight light source. KSF phosphor is a phosphor that emits Deep Red light and is used for excellent color reproduction.

A light source driving signal such as pulse width modulation (PWM) with duty is applied to the light source of the backlight.

The on or off of the light source is controlled by turning on or off the PWM signal.

Due to its own characteristics, the KSF phosphor generates a phenomenon in which red luminance is excited compared to green and blue in the duty-off interval of the PWM signal.

When red luminance is excited, a red afterimage may remain, affecting the image quality of the image.

One way to solve this problem is to increase the driving frequency of the PWM signal.

However, when the driving frequency of the PWM signal is increased, the gray level expression power is reduced, and the resolution of the image is reduced.

SUMMARY OF THE INVENTION

The purpose of the present disclosure may be to improve the resolution of the image, which is reduced as the driving frequency of the light source driving signal increases.

The purpose of the present disclosure may be to maintain gray level expression even if the driving frequency of the light source driving signal is increased to prevent red afterimages that occur when KSF phosphor is applied as a light source of a backlight.

The purpose of the present disclosure may be to determine the duty of the light source driving signal only with the local dimming value, thereby maintaining gray level expression even if the driving frequency of the light source driving signal increases.

A display device according to an embodiment of the present disclosure may comprise a liquid crystal display panel: a backlight configured to output a light to the liquid crystal display panel, wherein the backlight includes a plurality of backlight blocks and a light source driving circuit configured to generate a light source driving signal for controlling a light output of the backlight block, each backlight block has one or more LEDs (Light Emitting Diodes); and each LED is formed of KSF (Potassium fluorosilicate) phosphor; and a controller configured to: obtain a global dimming value and a local dimming value, determine a duty of the light source driving signal as the local dimming value if the global dimming value is less than a certain value, and reduce a constant current applied to the backlight block based on the global dimming value.

An operating method of a display device according to an embodiment of the present disclosure, wherein the display device includes a liquid crystal display panel: a backlight configured to output a light to the liquid crystal display panel, wherein the backlight includes a plurality of backlight blocks and a light source driving circuit configured to generate a light source driving signal for controlling a light output of the backlight block, each backlight block has one or more LEDs (Light Emitting Diodes) and each LED is formed of KSF (Potassium fluorosilicate) phosphor, may comprise obtaining a global dimming value and a local dimming value, determining a duty of the light source driving signal as the local dimming value if the global dimming value is less than a certain value, and reducing a constant current applied to the backlight block based on the global dimming value.

According to an embodiment of the present disclosure, even if the driving frequency of the PWM signal is increased to prevent red afterimages that occur due to the use of the KSF phosphor, gray level expression may be prevented from being reduced by the global dimming value.

According to an embodiment of the present disclosure, even if the driving frequency of the PWM signal increases due to the application of the KSF phosphor, the duty of the PWM signal is maintained and gray level expression may be maintained.

DETAILED DESCRIPTION OF THE PREFERRED EMBODIMENTS

Hereinafter, the present specification will be described in more detail with reference to the drawings.

The suffixes "module" and "part" used in the following description are assigned purely for the convenience of drafting this specification and do not inherently impart any special significance or role. Therefore, the terms "module" and "part" may be used interchangeably with each other.

Terms containing ordinal numbers, such as first, second, etc, may be used to describe various components, but the components are not limited by the terms. The above terms are used only for the purpose of distinguishing one component from another.

Singular expression includes plural expressions unless the context clearly dictates otherwise.

In this application, terms such as "comprise" or "have" are intended to designate the presence of features, numbers, steps, operations, components, parts, or combinations thereof described in the specification, but are not intended to indicate the presence of one or more other features and it should be understood that this does not exclude in advance the possibility of the existence or addition of elements, numbers, steps, operations, components, parts, or combinations thereof.

Figure 1:
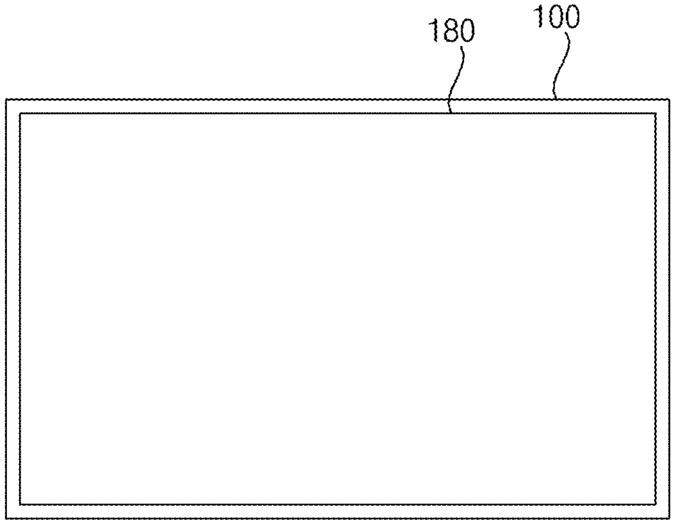
FIG. 1 is a diagram illustrating a display device according to an embodiment of the present invention.

FIG. 1 is a diagram illustrating a display device according to an embodiment of the present disclosure.

The display device 100 may include a display 180.

The display (180) may be implemented as either a Liquid Crystal Display (LCD) panel or an Organic Light Emitting Diode (OLED) panel.

Meanwhile, the display device 100 of FIG. 1 may be a monitor, TV, tablet PC, mobile terminal, etc.

Figure 2:
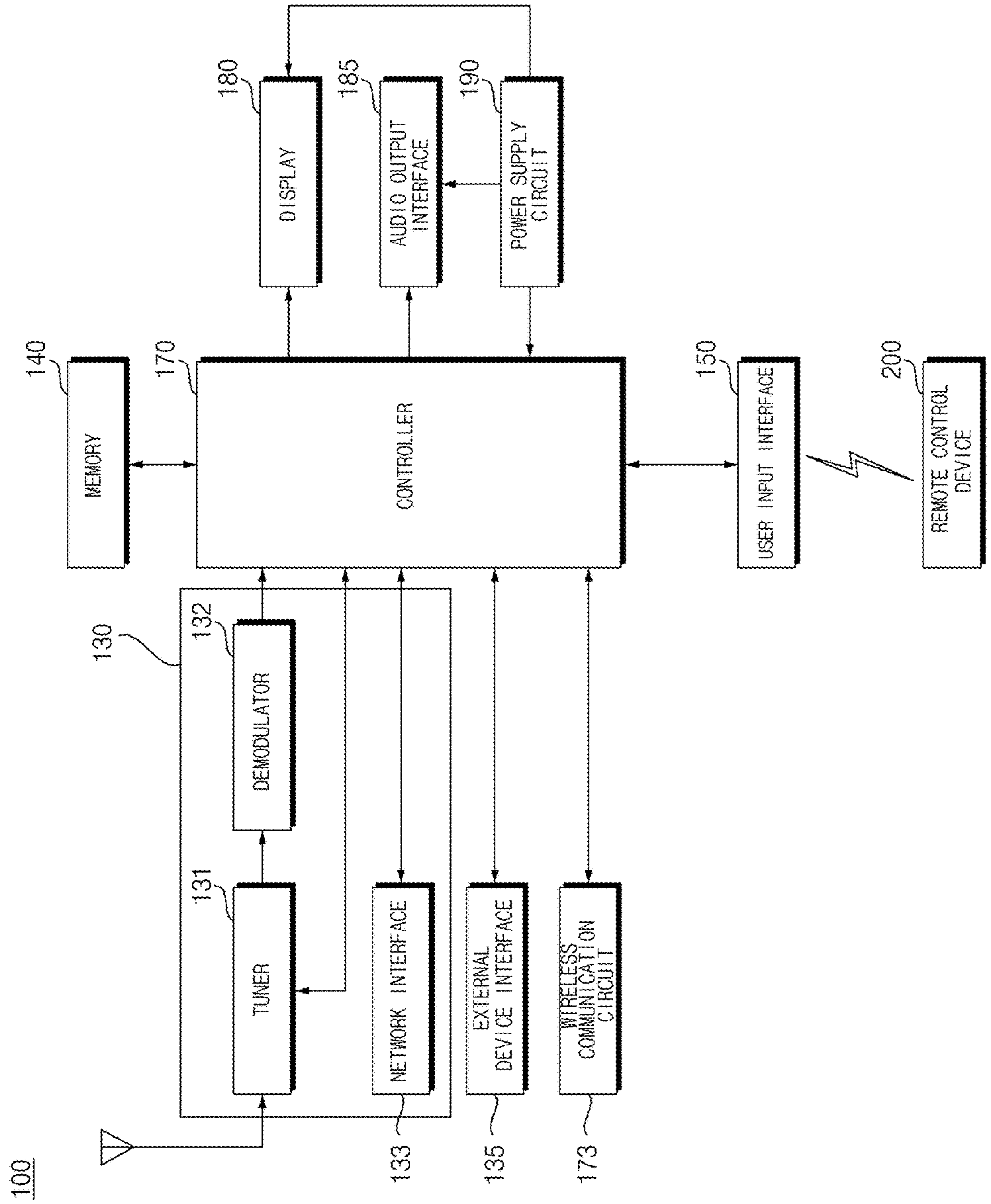
FIG. 2 is an example of a block diagram of the inside of the display device in FIG. 1.

FIG. 2 is a block diagram showing the configuration of the display device of FIG. 1.

Referring to FIG. 2, the display device 100 may include an image receiver 130, an external device interface 135, a memory 140, a user input interface 150, a controller 170, and a wireless communication circuit 173, a display 180, an audio output interface 185, and a power supply circuit 190.

The image receiver 130 may include a tuner 131, a demodulator 132, and a network interface 133.

The tuner 131 may select a specific broadcast channel according to a channel selection command. The tuner 131 may receive a broadcast signal for a specific selected broadcast channel.

The demodulator 132 may separate the received broadcast signal into a video signal, an audio signal, and a data signal related to the broadcast program, and may restore the separated video signal, audio signal, and data signal to a form that may be output.

The external device interface 135 may receive an application or application list in an adjacent external device and transmit it to the controller 170 or the memory 140.

The external device interface 135 may provide a connection path between the display device 100 and an external device. The external device interface 135 may receive one or more of video and audio output from an external device connected wirelessly or wired to the display device 100 and transmit it to the controller 170. The external device interface 135 may include a plurality of external input terminals. The plurality of external input terminals may include an RGB terminal, one or more High Definition Multimedia Interface (HDMI) terminals, and a component terminal.

An image signal from an external device input through the external device interface 135 may be output through the display 180. A audio signal from an external device input through the external device interface 135 may be output through the audio output interface 185.

An external device that may be connected to the external device interface 135 may be any one of a set-top box, Blu-ray player, DVD player, game console, sound bar, smartphone, PC, USB memory, or home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 stores program for processing and controlling each signal in the controller 170, and may store signal-processed video, audio, or data signal.

The memory 140 may perform a function for temporarily storing video, voice, or data signal input from the external device interface 135 or the network interface 133, and may store information about a predetermined image through a channel memory function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signal, data signal, and OSD signal processed by the controller 170, or image signal or data signal received from the external device interface 135 into R, G, and B signals, and generate drive signal.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Figure 3:
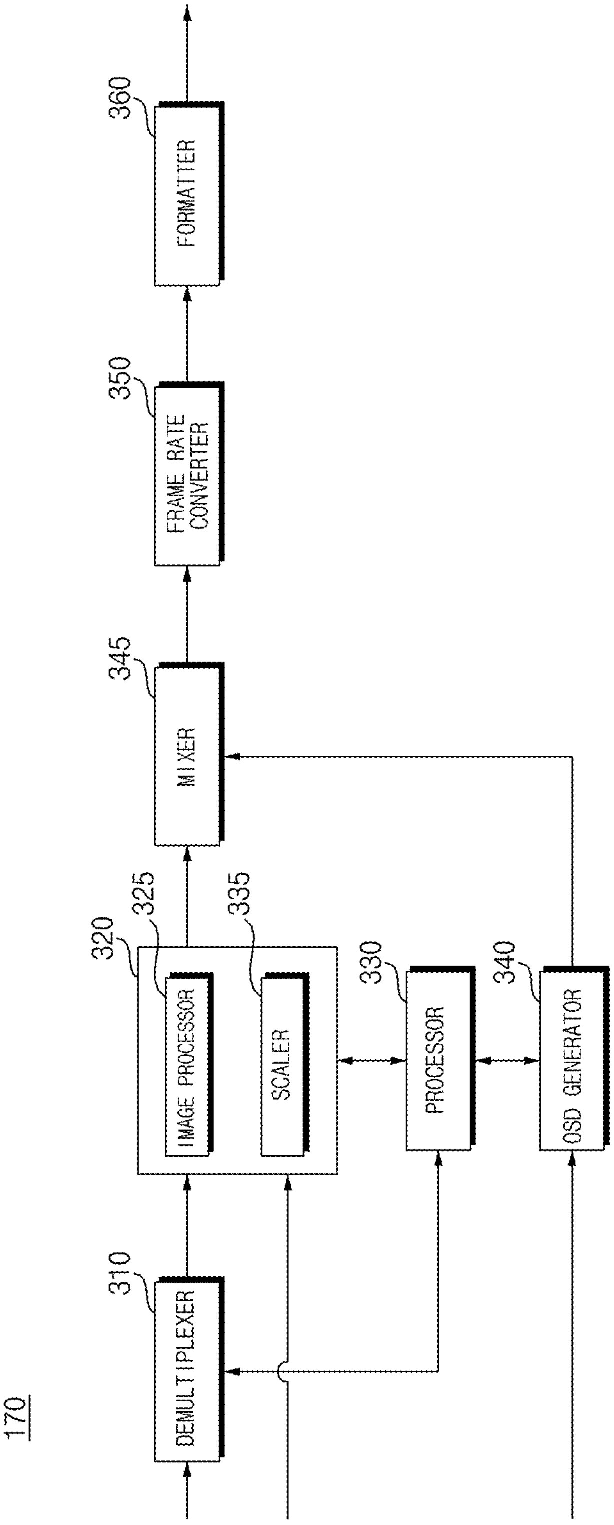
FIG. 3 is an example of a block diagram of the inside of a controller in FIG. 2.

FIG. 3 is an example of an internal block diagram of the controller of FIG. 2.

When described with reference to the drawing, the controller 170 according to an embodiment of the present disclosure may include a demultiplexer 310, an image processor 320, a processor 330, an OSD generator 340, and a mixer 345, a frame rate converter 350, and a formatter 360.

the controller 170 may further include an audio processor (not shown) and a data processor (not shown).

The demultiplexer 310 demultiplexes the input stream. For example, when MPEG-2 TS is input, it may be demultiplexed and separated into video, voice, and data signals. Here, the stream signal input to the demultiplexer 310 may be a stream signal output from the tuner 110, the demodulator 120, or the external device interface 130.

The image processor 320 may perform image processing of demultiplexed video signal. For this purpose, the image processor 320 may include an video decoder 325 and a scaler 335.

The video decoder 325 decodes the demultiplexed video signal, and the scaler 335 performs scaling so that the resolution of the decoded video signal may be output on the display 180.

The video decoder 325 may be equipped with decoder of various standards. For example, an MPEG-2, H,264 decoder, a 3D video decoder for color image and depth image, a decoder for multiple viewpoint images, etc. may be provided.

The processor 330 may control overall operations within the display device 100 or the controller 170. For example, the processor 330 may control the tuner 110 to select (tuning) an RF broadcast corresponding to a channel selected by the user or a pre-stored channel.

The processor 330 may control the display device 100 by a user command or internal program input through the user input interface 150.

The processor 330 may perform data transmission control with the network interface 135 or the external device interface 135.

The processor 330 may control the operations of the demultiplexer 310, the image processor 320, and the OSD generator 340 within the controller 170.

The OSD generator 340 generates an OSD signal according to user input or by itself. For example, based on a user input signal, a signal may be generated to display various information in graphic or text on the screen of the display 180. The generated OSD signal may include various data such as a user interface screen of the display device 100, various menu screen, widget, and icon. Additionally, the generated OSD signal may include 2D object or 3D object.

Additionally, the OSD generator 340 may generate a pointer that may be displayed on the display 180 based on the pointing signal input from the remote control device 200. In particular, such a pointer may be generated in a pointing signal processor, and the OSD generator 340 may include such a pointing signal processor (not shown). Of course, it is also possible that the pointing signal processor (not shown) is provided separately rather than within the OSD generator 340.

The mixer 345 may mix the OSD signal generated by the OSD generator 340 and the decoded video signal processed by the image processor 320. The mixed video signal is provided to the frame rate converter 350.

The frame rate converter (FRC) 350 may convert the frame rate of the input video. Meanwhile, the frame rate converter 350 is also capable of outputting the video as is without separate frame rate conversion.

Meanwhile, the formatter 360 may change the format of an input video signal into a video signal for display on a display and output it.

The formatter 360 may change the format of the video signal. For example, the format of the 3D video signal may be changed to any one of various 3D formats such as Side by Side format, Top/Down format, Frame Sequential format, Interlaced format, Checker Box format.

Meanwhile, the audio processor (not shown) in the controller 170 may perform audio processing of the demultiplexed audio signal. For this purpose, the audio processor (not shown) may be equipped with various decoders.

Additionally, the audio processor (not shown) within the controller 170 may process bass, treble, and volume control.

The data processor (not shown) within the controller 170 may perform data processing of the demultiplexed data signal. For example, if the demultiplexed data signal is an encoded data signal, it may be decoded. The encoded data signal may be electronic program guide information including broadcast information such as the start time and end time of the broadcast program aired on each channel.

Meanwhile, the block diagram of the controller 170 shown in FIG. 3 is a block diagram for an embodiment of the present disclosure. Each component of the block diagram may be integrated, added, or omitted depending on the specifications of the controller 170 that is actually implemented.

In particular, the frame rate converter 350 and the formatter 360 may not be provided within the controller 170, but may be provided separately or as a single module.

Figure 4:
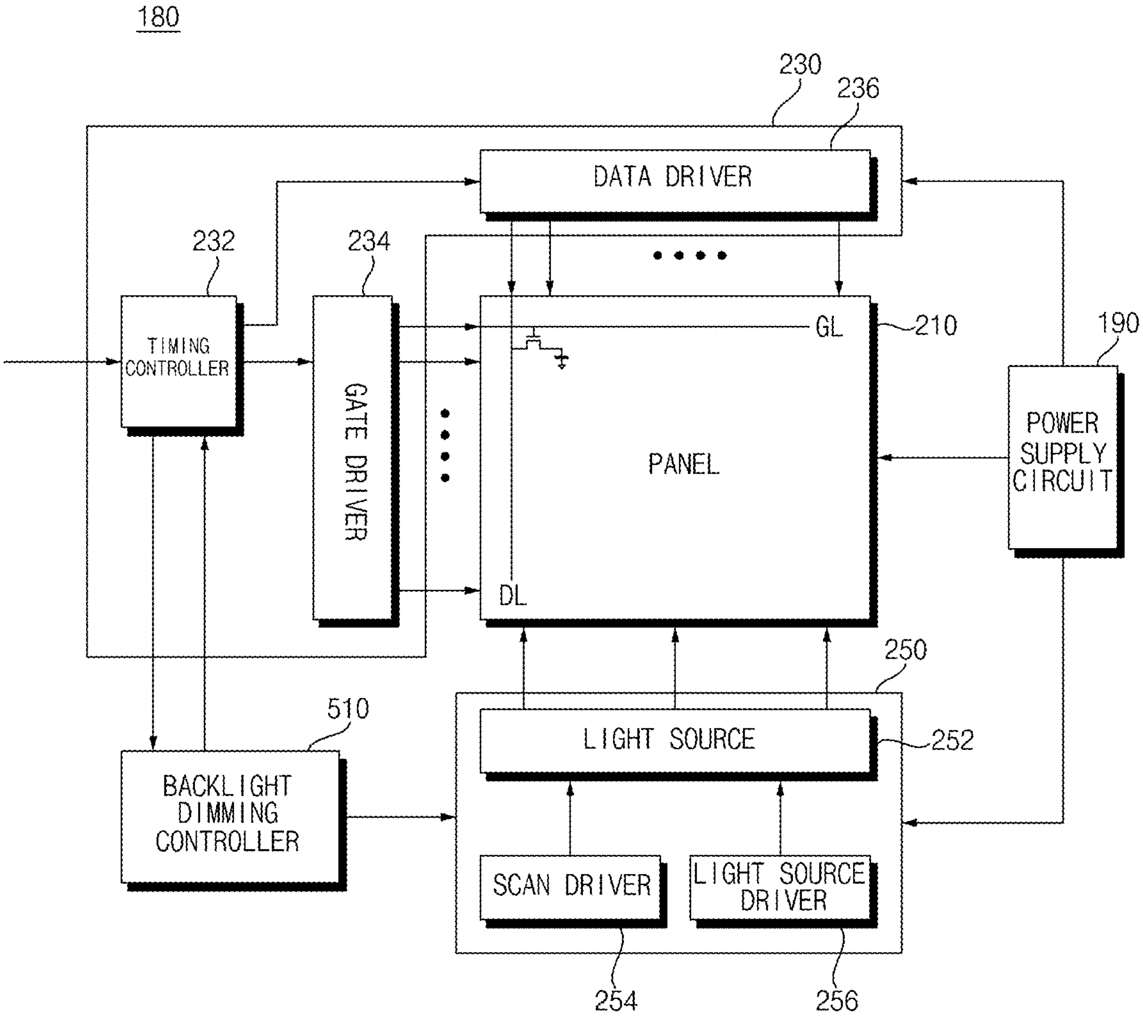
FIG. 4 is a block diagram of the inside of the display.

FIG. 4 is an internal block diagram of the display of FIG. 2.

Referring to the drawing, the display module 180 based on a liquid crystal display panel (LCD panel) may include a liquid crystal display panel 210, a driving circuit 230, a backlight 250, and a backlight dimming controller 510.

In order to display an image, a plurality of gate lines (GL) and data lines (DL) are intersected in a matrix form, and the liquid crystal display panel 210 may include a first substrate a thin film transistor and a pixel electrode connected to it are formed in the intersecting area, a second substrate provided with a common electrode, and a liquid crystal layer formed between the first substrate and the second substrate.

The driving circuit 230 drives the liquid crystal display panel 210 through control signal and data signal supplied from the controller 170 of FIG. 1. To this end, the driving circuit 230 includes a timing controller 232, a gate driver 234, and a data driver 236.

The timing controller 232 receives a control signal, R, G, B data signals, vertical synchronization signal (Vsync), etc. from the controller 170, and controls the gate driver 234 and the data driver 236 in response to the control signal and rearranges the R, G, and B data signals to provide to the data driver 236.

Under the control of the gate driver 234, data driver 236, and timing controller 232, scanning signal and image signal are supplied to the liquid crystal display panel 210 through the gate line (GL) and data line (DL).

The backlight 250 supplies light to the liquid crystal display panel 210. To this end, the backlight 250 may include a light source 252, a smay driver 254 that controls the scanning drive of the light source 252, and a light source driver 256 that turns on/off the light source 252.

With the light transmittance of the liquid crystal layer adjusted by the electric field formed between the pixel electrode and the common electrode of the liquid crystal display panel 210, a predetermined image is displayed using light emitted from the backlight 250.

The power supply circuit 190 may supply a common electrode voltage (Vcom) to the liquid crystal display panel 210 and a gamma voltage to the data driver 236. Additionally, driving power for driving the light source 252 may be supplied to the backlight 250.

Meanwhile, the backlight 250 may be divided into a plurality of blocks and driven. The controller 170 may control the display 180 to perform local dimming by setting a dimming value for each of the plurality of blocks.

Specifically, the timing controller 232 outputs input image data (RGB) to the backlight dimming controller 510, and the backlight dimming controller 510 may calculate the dimming value of each of the plurality of blocks based on the input image data (RGB) received from the timing controller 232.

The backlight dimming controller 510 may output dimming values to the backlight 250. The dimming value may include at least one of a duty ratio for driving each backlight block or a current magnitude ratio.

The backlight dimming controller 510 may be included in the controller 170.

Figure 5:
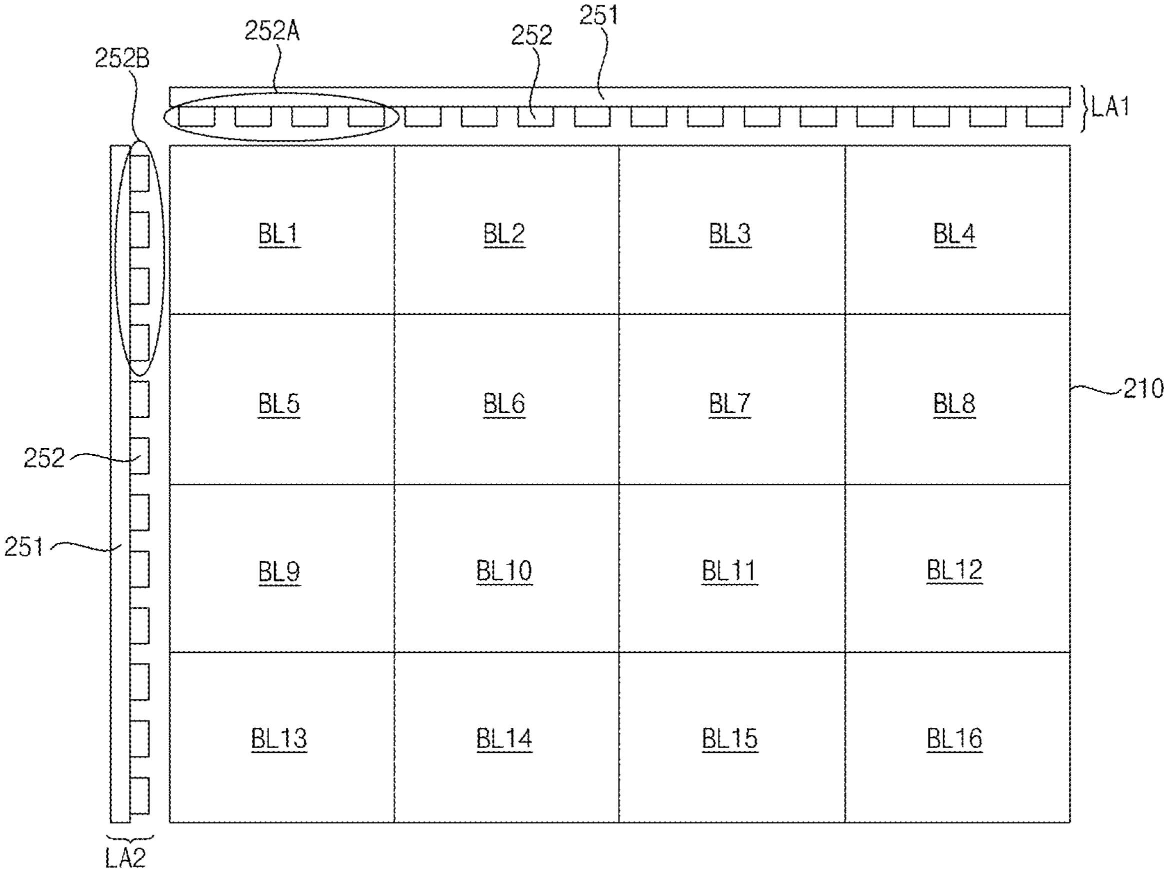
FIG. 5 is an example showing arrangement of a liquid crystal display panel and light sources in a direct-type backlight.
Figure 6:
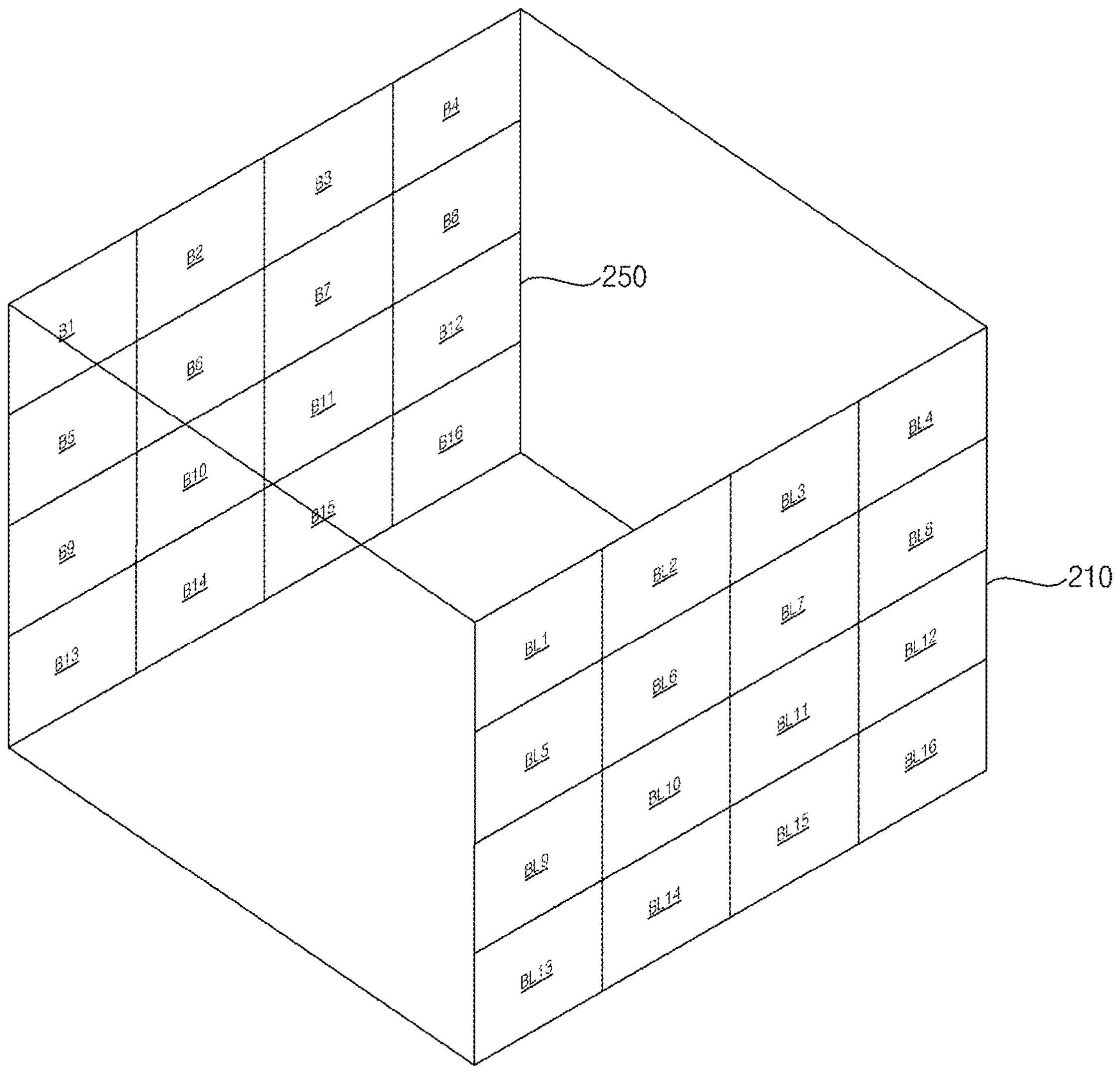
FIG. 6 is an example showing arrangement of a liquid crystal display panel and light sources in an edge type backlight.

FIG. 5 is an example diagram showing the arrangement of a liquid crystal display panel and light sources in the case of an edge-type backlight, and FIG. 6 is an example diagram showing the arrangement of a liquid crystal display panel and light sources in the case of a direct-type backlight.

The liquid crystal display panel 210 may be divided into a plurality of panel blocks as shown in FIGS. 5 and 6. FIGS. 5 and 6 illustrate that the liquid crystal display panel 210 is equally divided into 16 blocks BL1 to BL16, but it should be noted that it is not limited thereto. Each of the plurality of panel blocks may include a plurality of pixels.

The backlight 250 may be implemented as either an edge type or a direct type.

The edge-type backlight 250 has a structure in which a plurality of optical sheets and a light guide plate are stacked below the liquid crystal display panel 210, and a plurality of light sources are disposed on the sides of the light guide plate.

When the backlight 250 is implemented as an edge-type backlight, light sources are disposed on at least one of the upper and lower sides and at least one of the left and right sides of the liquid crystal display panel 210.

In FIG. 5, the first light source array LA1 is disposed on the upper side of the liquid crystal display panel 210, and the second light source array LA2 is disposed on the left side of the liquid crystal display panel 210. Each of the first and second light source arrays LA1 and LA2 includes a plurality of light sources 252 and a light source circuit board 251 on which the plurality of light sources 252 are mounted. In this case, the brightness of the light incident on the first block BL1 of the liquid crystal display panel 210 may be adjusted using the light sources 252A of the first light source array LA1 disposed at a position corresponding to the first block BL1 of the liquid crystal display panel 210 and and the light sources 252B of the second light source array LA2.

The direct backlight 250 has a structure in which a plurality of optical sheets and a diffusion plate are stacked below the liquid crystal display panel 210 and a plurality of light sources are arranged below the diffusion plate.

When the backlight 250 is implemented as a direct backlight, it is divided to correspond one-to-one to the blocks BL1 to BL16 of the liquid crystal display panel 210, as shown in FIG. 6. In this case, the brightness of the light incident on the first block BL1 of the liquid crystal display panel 210 may be adjusted using the light sources 252 included in the block B1 of the backlight 250 disposed at a position corresponding to the first block BL1 of the liquid crystal display panel 210.

The light sources 252 may be implemented as point light sources such as light emitting diodes (LEDs). The light sources 252 are turned on and off by receiving a light source driving signal (LDS) from the light source driver 256.

The light source driving signal may be a PWM (Pulse Width Modulation) signal.

The light intensity of the light sources 252 may be adjusted according to the amplitude of the light source driving signal (LDS), and the lighting period may be adjusted according to the pulse width (or duty ratio). The brightness of light output from the light sources 252 may be adjusted according to the light source driving signal (LDS).

The light source driver 256 may generate the light source driving signal (LDS) based on the dimming value of each block input from the backlight dimming controller 510 and output them to the light source 252.

Figure 7:
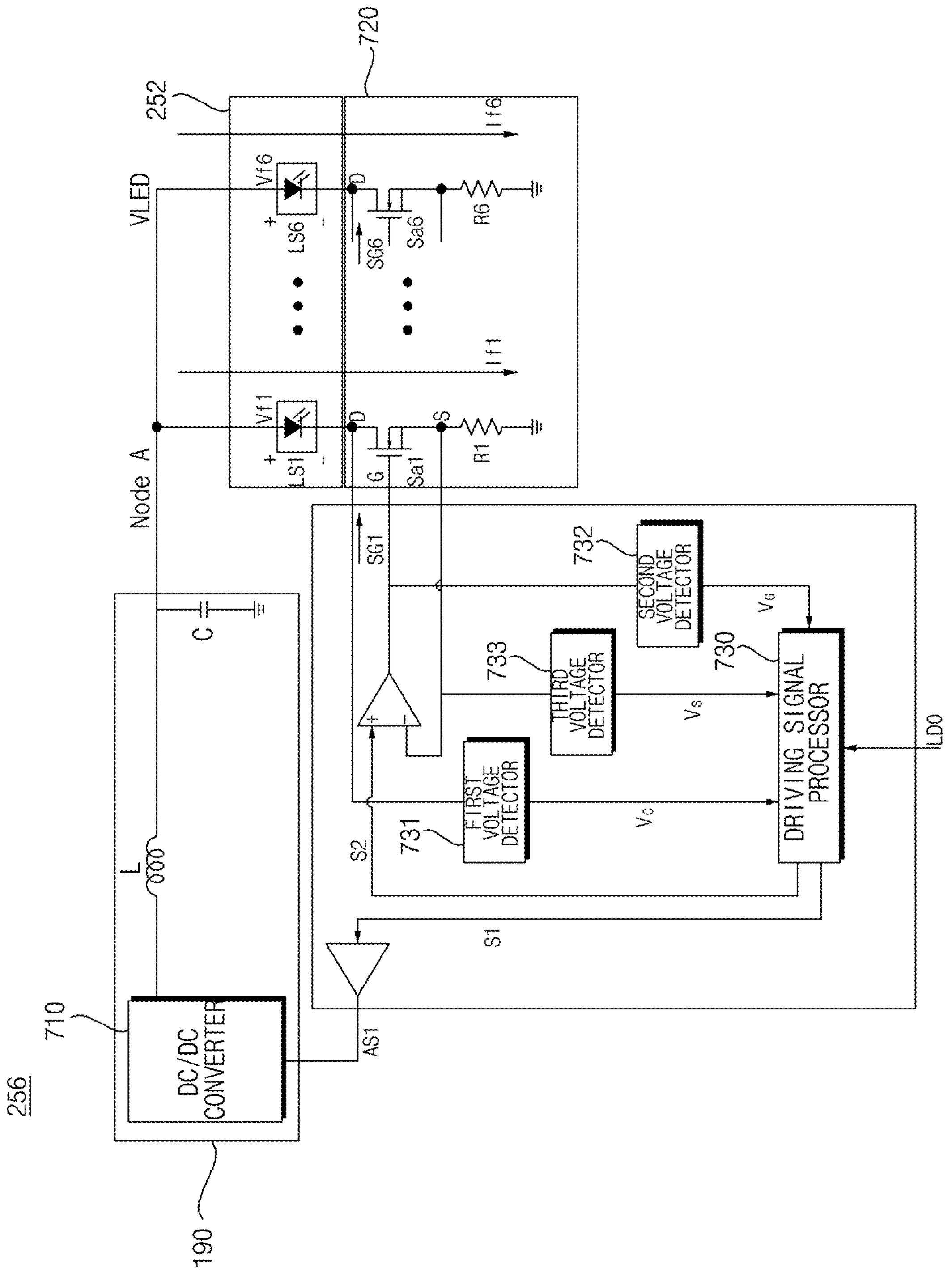
FIG. 7 is an example of a light source driving circuit according to an embodiment of the present disclosure.

FIG. 7 is an example of a light source driving circuit according to an embodiment of the present disclosure.

The light source driving circuit 256 may include a light source control circuit 720 that drives a plurality of light sources (LS1 to LS6) 252 and a driving signal processor 730 that controls the light source control circuit 720.

The light source driving circuit 256 may receive a power from the power supply circuit 190. The power supply circuit 190 may supply a common power source (VLED) to a plurality of light sources (LS1 to LS6) 252 connected in parallel.

Each of the light sources LS1 to LS6 represents a light source, and each light source may include a plurality of LEDs in series.

Meanwhile, as the resolution of the display device 100 increases to High Definition (HD), Full HD, Ultra High Definition (UHD), 4K, 8K, etc, the number of LEDs may increase.

Meanwhile, when using the high-resolution display panel 210, in order to improve contrast, it is desirable to control the current If with a changed level to flow for each light source based on local dimming data.

According to this, by allowing the level-changed current If to flow in proportion to the local dimming data, a light of different luminance according to the local dimming data is output for each of the plurality of light sources LS1 to LS6.

Accordingly, due to the current If whose level is increased, the luminance of the bright part becomes brighter and the luminance of the dark part becomes darker. Ultimately, the contrast when displaying an image is improved, and the sharpness when displaying an image is improved.

The power supply circuit 190 outputs a common voltage (VLED) to a plurality of light sources. For this purpose, the power supply circuit 190 may include a dc/dc converter 710 for converting the level of a direct current power and outputs it, an inductor (L) for removing harmonics, etc, and a capacitor (C) for storing the direct current power.

The voltage across the capacitor (C) corresponds to the voltage supplied between node A and a ground terminal, which corresponds the voltage applied to a plurality of light sources (LS1 to LS6) 252 and a plurality of switching elements (Sa1 to Sa6), and the resistance elements (R1 to R6). That is, the voltage of node A is the common voltage supplied to the plurality of light sources LS1 to LS6, and may be referred to as the VLED voltage, as shown in the figure.

The VLED voltage is equal to a sum of a driving voltage (Vf1) of a first light source (LS1), a voltage across a first switching element (Sa), and a voltage consumed in a first resistance element (Ra).

Alternatively, the VLED voltage is equal to a sum of a driving voltage (Vf2) of a second light source (LS2), a voltage across a second switching element (Sa2), and a voltage consumed in a second resistance element (Rb). Alternatively, the VLED voltage is equal to a sum of a driving voltage (Vf6) of a sixth light source (LS6), a voltage across a sixth switching element (Sa6), and a voltage consumed in a sixth resistance element (R6).

Meanwhile, as the resolution of the display panel 210 increases, the backlight driving voltage (Vf1 to Vf6) increases and the driving current (If1 to If6) flowing through the backlight also increases.

Meanwhile, the driving signal processor 730 includes a first voltage detector 731 that detects a voltage VD of each drain terminal (G) of the plurality of switching elements (Sa1 to Sa6) implemented with FET, etc.

Meanwhile, the driving signal processor 730 may further include a second voltage detector 732 that detects a voltage (VG) of each gate terminal (G), and a third voltage detector 733 that detects a voltage (VS) of each source terminal(S).

The driving signal processor 730 may compare each drain terminal voltage (VD) detected at each drain terminal (G) of the plurality of switching elements (Sa1 to Sa6), and based on the lowest drain terminal voltage among them, generate a target driving current flowing through the plurality of light sources LS1 to LS6 and output a switching control signal SG corresponding to the generated target driving current.

The switching control signal (SG) is input to the comparator, and when it is greater than the detected voltage (VD) of the source terminal, it is output from the comparator and input to the gate terminal (G). Ultimately, the switching element is driven based on the switching control signal (SG).

Meanwhile, in order to generate this switching control signal, the driving signal processor 730 may include a light source processor 730 that generates a switching control signal for driving each gate terminal of the plurality of switching elements Sa1 to Sa6 based on the voltage of each drain terminal of the plurality of switching elements Sa1 to Sa6.

Meanwhile, the light source processor 730 may vary a amplitude of the switching control signal SG based on a magnitude of the drain terminal voltage VD of each of the plurality of switching elements Sa1 to Sa6.

Hereinafter, the display 180 may be named as the LCD display 180.

Figure 8:
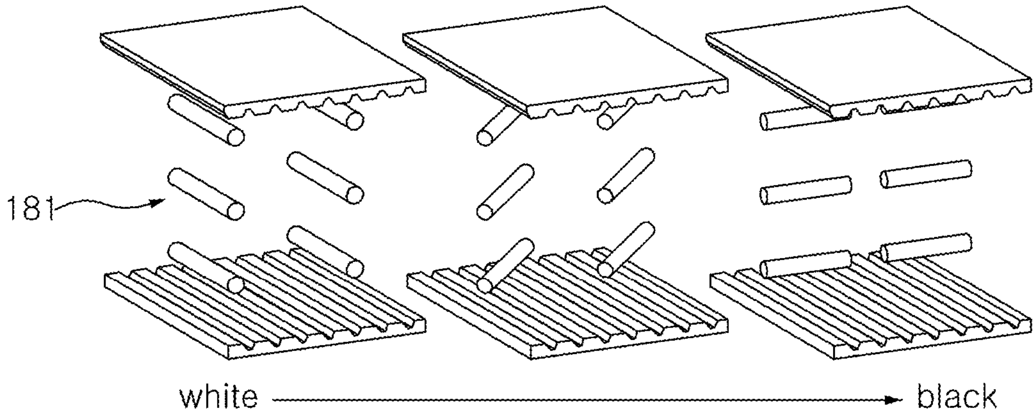
FIGS. 8 to 10 are diagrams illustrating the process by which a red afterimage is generated when KSF phosphor is applied to an LED used as a light source of a backlight.
Figure 8:
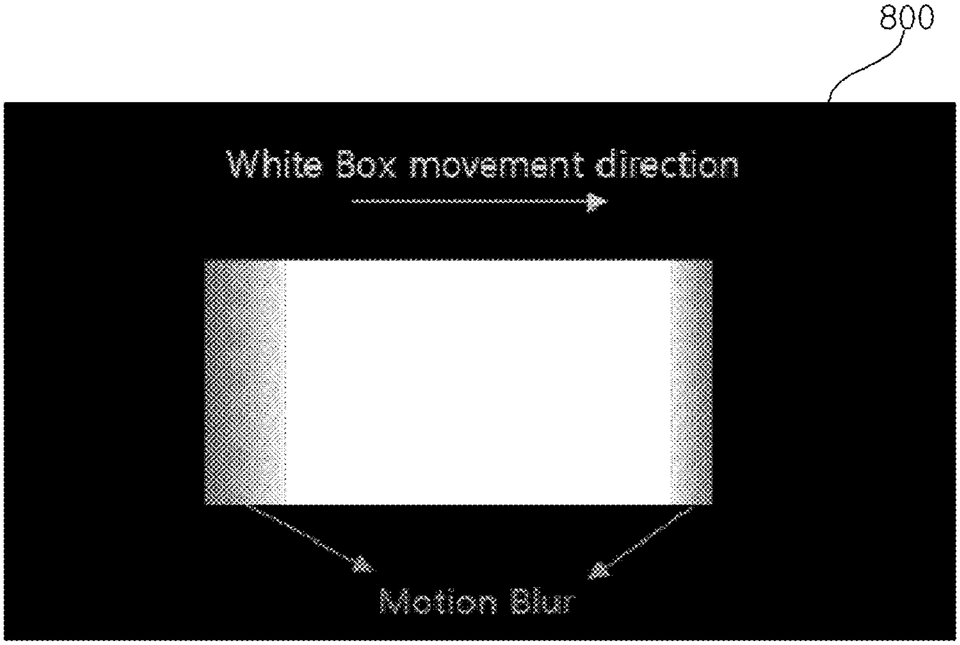
Figure 9:
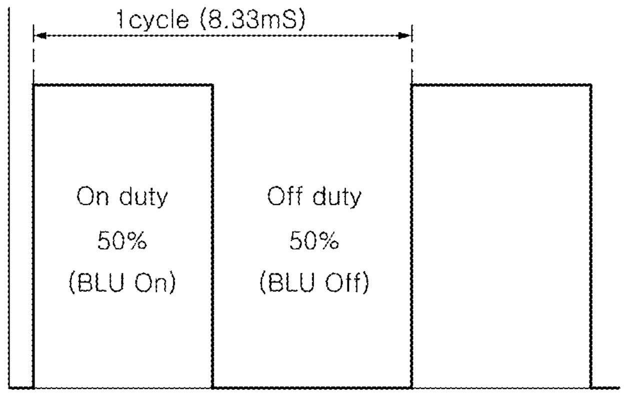
Figure 9:
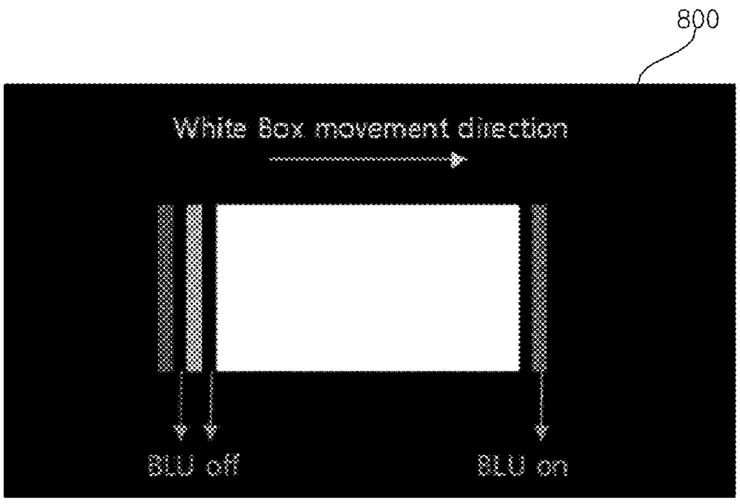
Figure 10:
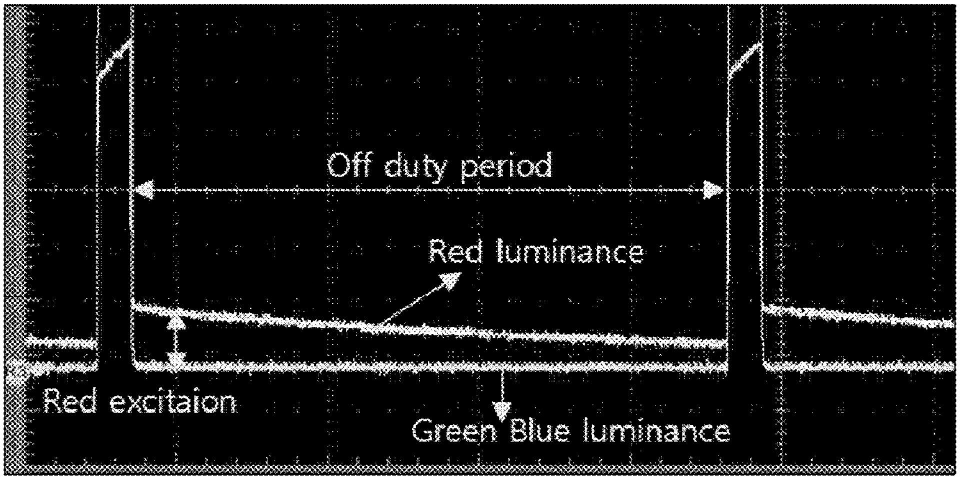
Figure 10:
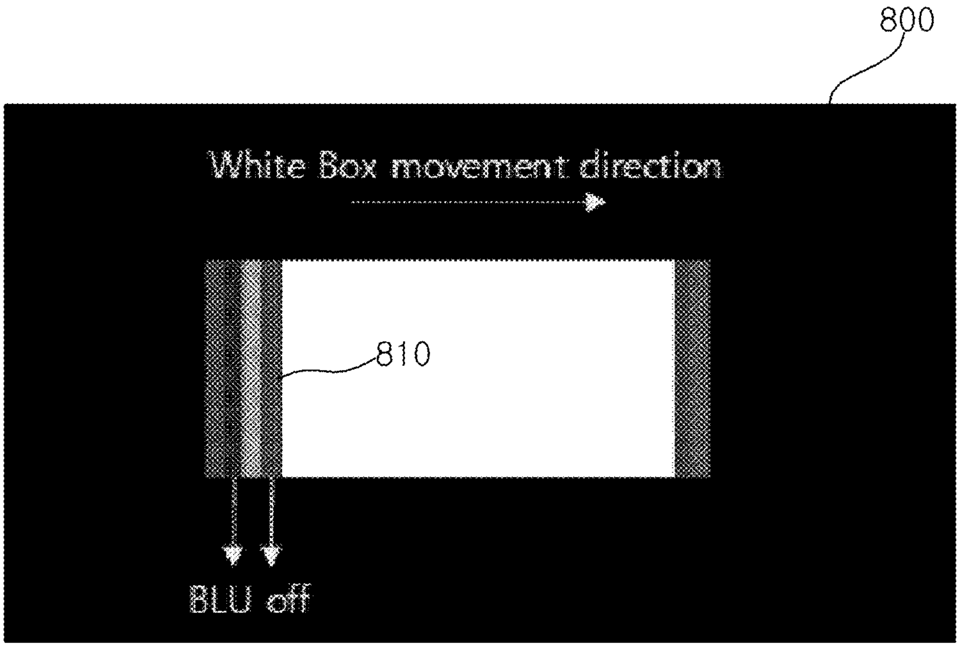

FIGS. 8 to 10 are diagrams illustrating the process by which a red afterimage is generated when KSF phosphor is applied to an LED used as a light source of a backlight.

The red afterimage may be generated by the response speed of the liquid crystal of the LCD display 180, the duty of the PWM signal, and the excitation of red luminance due to the KSF phosphor.

FIGS. 8 to 10, it is assumed that a white box (or white box image) is moved from left to right over an entire area 800 of the display 180.

That is, in FIGS. 8 to 10, a video may be playing.

FIG. 8 shows that when the white box moves from left to right, a motion blur occurs due to the response speed of the liquid crystal included in the display 180.

Referring to (a) of FIG. 8, it shows a change in the liquid crystal 181 due to a change in luminance when the white box moves from left to right. Referring to (b) of FIG. 8, it shows that when the white box moves from left to right, the response speed of the liquid crystal is delayed and the motion blur occurs.

In (a) of FIG. 9 shows the waveform of a PWM signal 900 for driving the light source 252 of the backlight 250. When the driving frequency of the PWM signal 900 is 120 Hz, one cycle of the PWM signal 900 has a time period of 8.33 ms.

When the duty of the PWM signal 900 is 50%, the on interval (On duty interval or BLU On interval) of the PWM signal 900 is 50% of 8.33 ms, and the off interval (Off duty interval) of the PWM signal 900 is 50% of 8.33 ms.

When the PWM signal 900 is turned on, the light source 252 of the backlight 250 emits light, and when the PWM signal 900 is turned off, the light source 252 of the backlight 250 does not emit light.

Referring to (b) of FIG. 9, when the duty of the PWM signal is 50% and the white box moves from left to right, it shows the effect of the response speed of the liquid crystal and the duty of the PWM signal 900. A gray image is displayed in the on interval of the PWM signal 900, and a black image is displayed in the off interval.

In (a) of FIG. 10 shows a red luminance waveform, a green luminance waveform, and a blue luminance waveform output by the pixel in the off interval of the PWM signal 900 when the duty of the PWM signal 900 is 50%.

In the off interval of the PWM signal 900, the red luminance waveform shows an excitation phenomenon compared to the green luminance waveform and the blue luminance waveform. In the off interval of the PWM signal 900, the red luminance gradually decreases compared to the luminance of other color. That is, the response speed to red decreases in the off interval of the PWM signal 900. This is due to the KSF phosphor used in the LED of the light source 252 due to its own characteristic of emitting red light.

For this reason, as shown in (b) of FIG. 10, when the white box moves, a problem occurs in which the red afterimage 810 appears in the off interval (BLU off interval) of the PWM signal 900 due to the response speed of the liquid crystal, the duty of the PWM signal, and the use of the KSF phosphor.

Figure 11:
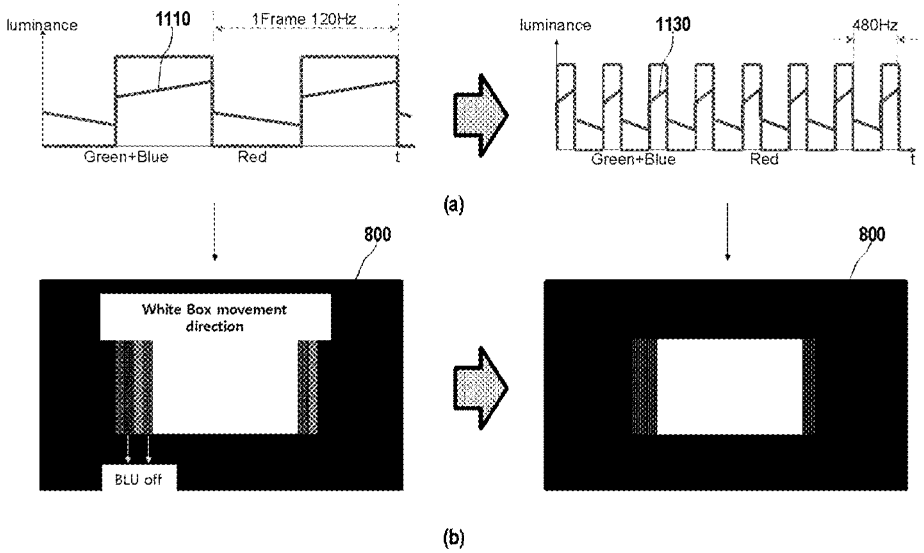
FIG. 11 is a diagram illustrating a method for improving the red afterimage that occurs when KSF phosphor is applied to an LED used as a backlight light source.

FIG. 11 is a diagram illustrating a method for improving the red afterimage that occurs when KSF phosphor is applied to an LED used as a backlight light source.

Referring to (a) of FIG. 11, it shows changes in the red luminance waveform, the green luminance waveform, and the blue luminance waveform as the driving frequency of the PWM signal is increased from 120 Hz to 480 Hz to improve the red afterimage.

When the driving frequency of the PWM signal is 120 Hz, a first waveform 1110 of red luminance is compared with a second waveform 1130 of red luminance when the driving frequency of the PWM signal is increased four times to 480 Hz. Referring to the second waveform 1130, as the off interval of the PWM signal decreases, the interval where red luminance is excited also decreases.

Accordingly, when the driving frequency of the PWM signal is increased, the off interval of the PWM signal is shortened, so that the red afterimage 810 may be improved, as shown in (b) of FIG. 11. That is, the off interval of the PWM signal is shortened, so the time for the red afterimage 810 to be recognized by the viewer's eyes may be reduced.

However, when the driving frequency of the PWM signal increases, there is a problem that the gray level expression of the image is reduced.

Figures 12A, 12B:
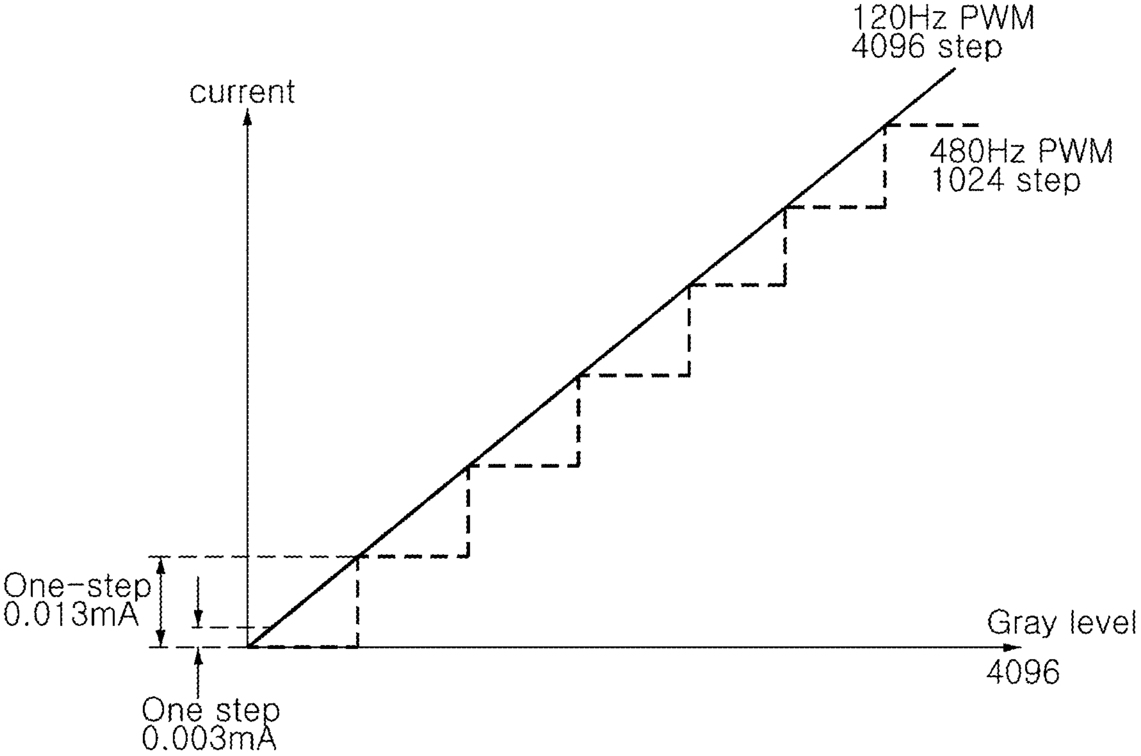
FIGS. 12A and 12B are diagrams illustrating that when the driving frequency of the PWM signal increases, the gray level expression of the image decreases.

FIGS. 12A and 12B are diagrams illustrating that when the driving frequency of the PWM signal increases, the gray level expression of the image decreases.

Referring to FIG. 12A, a graph showing the relationship between gray level and current is shown.

A first graph 1210 may be a graph showing the relationship between gray level and current when the driving frequency of the PWM signal is 120 Hz.

A second graph 1230 may be a graph showing the relationship between gray level and current when the driving frequency of the PWM signal is 480 Hz.

FIG. 12B is a diagram comparing a gray level expression level, a driving method, a reference current, and a current corresponding to one gray level level for cases where the driving frequency of the PWM signal is 120 Hz and 480 Hz, respectively.

If the driving frequency of the PWM signal is 120 Hz, the gray level or gray level level may be divided into 4096 levels and expressed. On the other hand, when the driving frequency of the PWM signal is 480 Hz, the gray level may be divided into 1024 levels and expressed.

When the driving frequency of the PWM signal increases, the number of clock pulses of the light source driving circuit 256 that operates at a fixed clock speed within a shortened time period of one cycle may be reduced. This leads to a decrease in the number of bits, resulting in a decrease in gray level expression.

It is assumed that a reference current provided to the light source 252 or the backlight block of the backlight 250 is 13 mA. The reference current may also be referred to as a constant current.

If the driving frequency of the PWM signal is 120 Hz, the gray level may be expressed in 4096 steps, and one step may correspond to a current of 0.003 mA (13 mA/4096). That is, in order to increase one gray level, a current of 0.003 mA must be additionally applied to the light source 252.

If the driving frequency of the PWM signal is 480 Hz, the gray level may be expressed in 1024 steps, and one step may correspond to a current of 0.013 mA (13 mA/1024). That is, in order to increase one gray level, a current of 0.013 mA must be additionally applied to the light source 252.

When the driving frequency of the PWM signal increases from 120 Hz to 480 Hz, 4 steps of gray level are expressed as 1 step of gray level. In other words, if the driving frequency of the PWM signal is increased by 4 times, the number of bits is reduced by 2 bits from 12 bits to 10 bits, and the gray level expression is reduced by ¼ times.

As a result, whenever the driving frequency of the PWM signal is doubled, the number of bits is reduced by 1 bit, and gray level expression is reduced by ½.

As the gray level expression is reduced by ½, the resolution of the image may also be reduced by ½.

Figure 13:
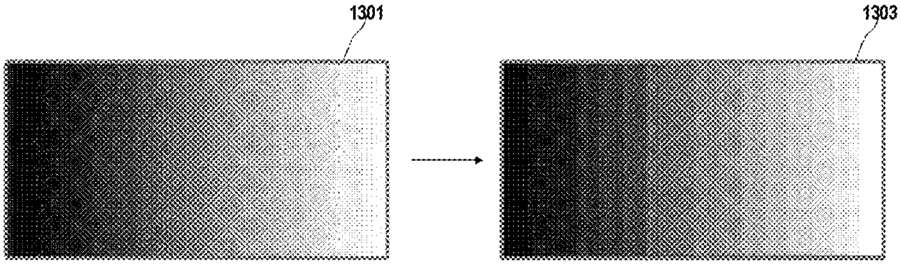
FIG. 13 is a diagram showing that when the driving frequency of the PWM signal increases from 120 Hz to 480 Hz, the resolution of the image decreases.
Figure 13:
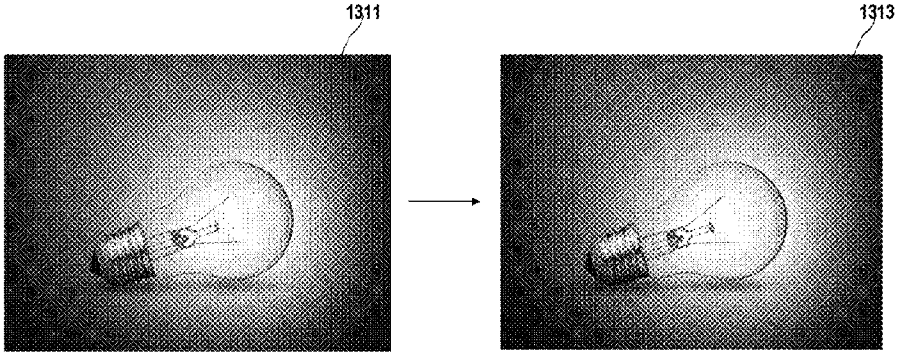

FIG. 13 is a diagram showing that when the driving frequency of the PWM signal increases from 120 Hz to 480 Hz, the resolution of the image decreases.

Referring to (a) of FIG. 13, a first test image 1301 is an image displayed on the screen when the driving frequency of the PWM signal is 120 Hz, and a second test image 1303 is an image displayed on the screen when the driving frequency of the PWM signal is 480 Hz.

The number of gray level steps corresponding to the first test image 1301 is 4096, and the number of gray level steps corresponding to the second test image 1303 is 1024. In other words, it may be seen that as the driving frequency of the PWM signal increases, the gray level expression also decreases, making the image unnatural.

Referring to (b) of FIG. 13, a first light bulb image 1311 is an image displayed on the screen when the driving frequency of the PWM signal is 120 Hz, and a second light bulb image 1313 is an image displayed on the screen when the driving frequency of the PWM signal is 480 Hz.

The number of gray level steps corresponding to the first light bulb image 1311 is 4096, and the number of gray level steps corresponding to the second light bulb image 1313 is 1024. In other words, it may be seen that as the driving frequency of the PWM signal increases, the gray level expression power also decreases, making the image unnatural.

The present disclosure seeks to solve the problem of resolution reduction caused by increasing the driving frequency of the PWM signal in order to prevent the red afterimage caused by the KSF phosphor used in the LED light source of the backlight.

In the present disclosure, the resolution reduction problem may be solved by increasing the driving frequency of the PWM signal and adjusting the constant current applied to the backlight block or the amplitude of the PWM signal.

Figure 14:
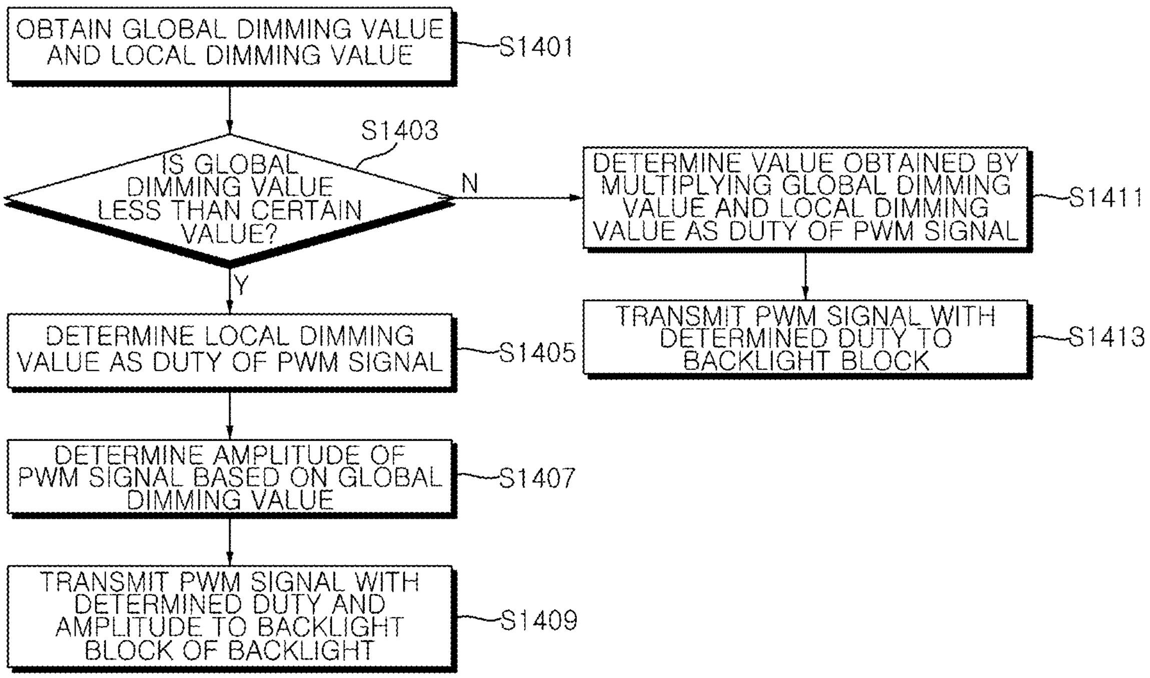
FIG. 14 is a flowchart illustrating a method of operating a display device according to an embodiment of the present disclosure.

FIG. 14 is a flowchart illustrating a method of operating a display device according to an embodiment of the present disclosure.

The local dimming method may be a method of locally controlling the brightness of each of a plurality of local areas that make up the entire screen area. The local dimming method may be a method of controlling the brightness of each local area by individually controlling each of the backlight blocks corresponding to each of the plurality of local areas.

In one embodiment, a global dimming value and a local dimming value may be used to drive the local dimming method.

The global dimming value may be a global duty of the PWM signal uniformly applied to a plurality of backlight blocks.

The local dimming value may be a local duty of the PWM signal individually applied to each of the plurality of backlight blocks.

In one embodiment, the controller 170 may be the backlight dimming controller 510 of FIG. 4.

In another embodiment, the backlight dimming controller 510 may be included in the controller 170.

Hereinafter, the PWM signal may be referred to as a light source driving signal.

Referring to FIG. 14, the controller 170 may obtain a global dimming value and a local dimming value (S1401).

The global dimming value may have any value from 0 to 100. The unit of the global dimming value may be %.

In one embodiment, the global dimming value may be a value that varies depending on user setting. A user may set a brightness value through the menu screen. The corresponding brightness value may be the global dimming value.

In another embodiment, the global dimming value may be a value that may be changed by a preset method. For example, the preset method may be a method in which the global dimming value varies depending on the image displayed on the screen. For example, the preset method may be an algorithm in which the global dimming value is set to 0 when the image displayed on the screen is a black image.

In one embodiment, the controller 170 may obtain a local dimming value corresponding to each backlight block based on image data corresponding to the image displayed on the screen.

Specifically, the controller 170 may obtain the brightness of each of a plurality of local areas based on image data, and obtain a local dimming value corresponding to each local area using the obtained brightness.

The controller 170 may obtain a plurality of local dimming values corresponding to each of the plurality of backlight blocks.

The controller 170 may determine whether the obtained global dimming value is less than a certain value (S1403).

In one embodiment, the certain value may be 100, but this is just an example.

If the global dimming value is less than the certain value, it may indicate that the image displayed on the screen is a dark image.

If the global dimming value is less than the certain value, the controller 170 may determine the local dimming value as the duty of the PWM signal (S1405).

The PWM signal may be a light source driving signal provided to the backlight block.

According to the prior art, the duty of the PWM signal may be determined as the product of the global dimming value and the local dimming value.

If the global dimming value is less than the certain value, the controller 170 may not use the global dimming value to determine the duty of the PWM signal to prevent deterioration of gray level expression due to a decrease in the duty of the PWM signal.

Even when the global dimming value is less than 100, if the duty of the PWM signal is determined by considering the global dimming value and the local dimming value, the duty of the PWM signal is reduced and the gray level expression is further reduced.

The controller 170 may determine an amplitude of the PWM signal based on the global dimming value (S1407).

In one embodiment, the controller 170 may change the amplitude of the PWM signal from a first amplitude to a second amplitude based on the global dimming value. The first amplitude may be the initial setting amplitude of the PWM signal, and the second amplitude may be an amplitude considered in the global dimming value.

The amplitude of the PWM signal may vary depending on the global dimming value. The amplitude of the PWM signal and the global dimming value may be proportional. As the global dimming value decreases, the amplitude of the PWM signal may decrease, and as the global dimming value increases, the amplitude of the PWM signal may also increase.

The controller 170 may adjust the constant current provided to the backlight block based on the global dimming value. The constant current may be proportional to the global dimming value when the global dimming value is less than the certain value.

The controller 170 may reduce the constant current to be proportional to the global dimming value. The controller 170 may adjust the amplitude of the PWM signal to correspond to the reduced amount of constant current. The controller 170 may reduce the amplitude of the PWM signal by the amount of the reduced constant current.

If the global dimming value is less than the certain value, the controller 170 may reduce the constant current provided to the backlight block to be linked to the global dimming value. The controller 170 may determine the reduced constant current as the amplitude of the PWM signal.

In another embodiment, the controller 170 may determine the amplitude of the PWM signal based on the global dimming value and a Boost Peak Luminance (BPL) value. This will be described later.

The controller 170 may transmit the PWM signal with a determined duty and amplitude to the backlight block of the backlight 250 (S1409).

The controller 170 may control the light source driving circuit 256 so that the PWM signal with a determined duty and amplitude is transmitted to the backlight block.

The controller 170 may transmit the determined duty and amplitude to the light source driving circuit 256, and the light source driving circuit 256 may generate the PWM signal with the determined duty and amplitude.

The controller 170 may also transmit the driving frequency of the PWM signal to the light source driving circuit 256. The light source driving circuit 256 may generate the PWM signal with a duty and amplitude determined according to the received driving frequency and transmit the generated PWM signal to the backlight block.

Meanwhile, when the global dimming value is more that the certain value, the controller 170 may determine the value obtained by multiplying the global dimming value and the local dimming value as the duty of the PWM signal (S1411).

For example, if the global dimming value is 50% and the local dimming value is 100%, the duty of the PWM signal may be 50% (0.5=0.5×1)

The controller 170 may transmit the PWM signal with a determined duty to the backlight block (S1413).

The controller 170 may control the light source driving circuit 256 to output the PWM signal with the determined duty.

Figure 15:
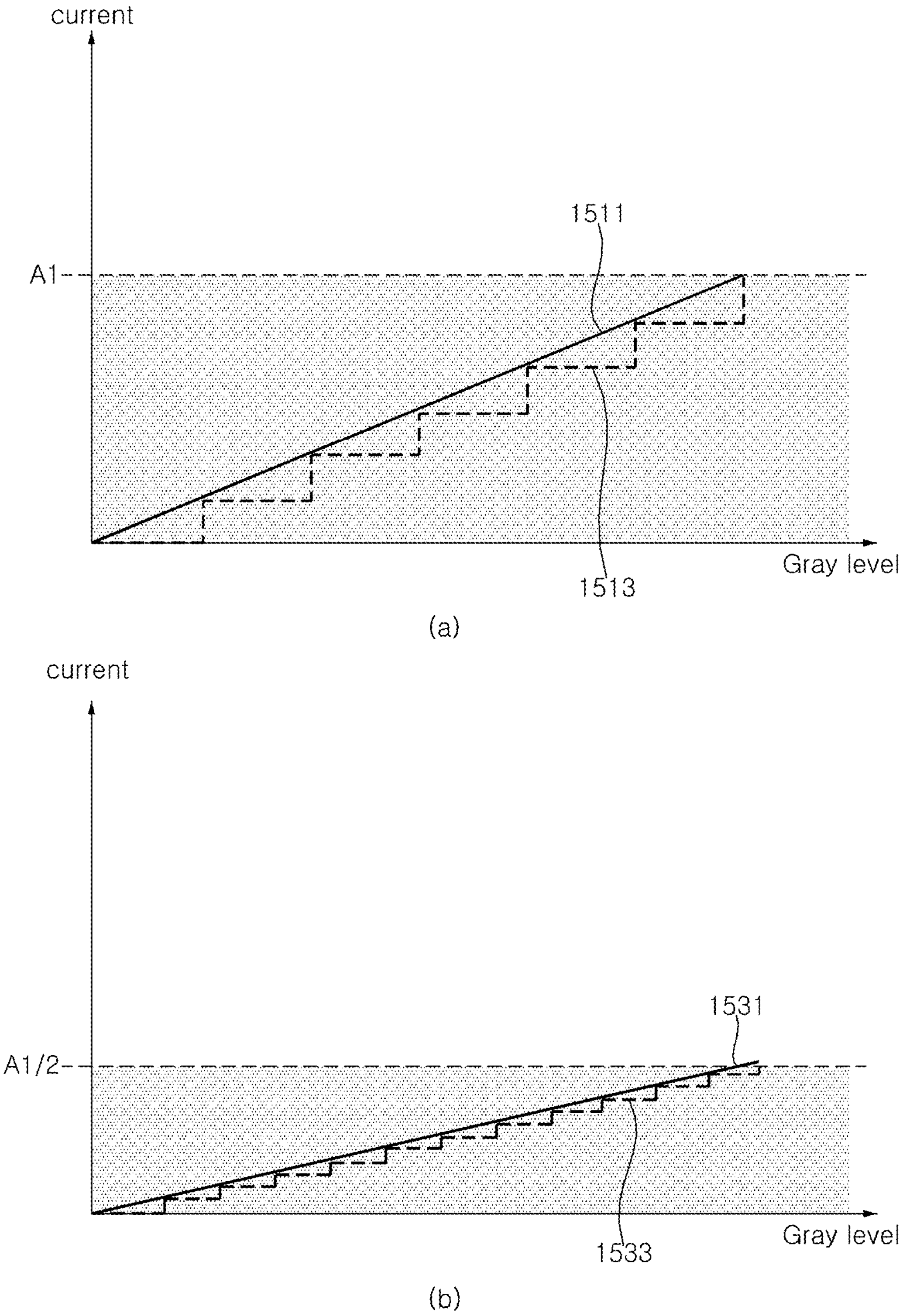
FIG. 15 is a diagram comparing PWM driving areas according to the prior art and an embodiment of the present disclosure when the global dimming value is 50%.

FIG. 15 is a diagram comparing PWM driving areas according to the prior art and an embodiment of the present disclosure when the global dimming value is 50%.

The PWM driving area may be an area representing gray levels that may be expressed through a PWM signal.

In FIG. 15, it is assumed that the global dimming value is 50% and the local dimming value is 100%.

In (a) of FIG. 15, the constant current value provided to the backlight block or the light source of the backlight block may be A1.

Referring to (a) of FIG. 15, a first graph 1511 may be a graph showing the relationship between gray level and current when the driving frequency of the PWM signal is 120 Hz, and a second graph 1513 may be a graph showing the relationship between gray level and current, when the driving frequency of the PWM signal is 480 Hz.

According to the prior art, the duty of the PWM signal is 50% (0.5), which is the product of the global dimming value and the local dimming value.

As the duty of the PWM signal becomes 50%, the gray level expression may be reduced from 4096 gray level to 512 gray level due to the influence of the driving frequency of the PWM signal increasing from 120 Hz to 480 Hz and the influence of the duty of the PWM signal decreasing to 50% (number of bits reduced from 12 bits to 9 bits).

In an embodiment of the present disclosure, the global dimming value may not be considered when calculating the duty of the PWM signal. That is, the duty of the PWM signal may be determined only by the local dimming value.

According to an embodiment of the present disclosure, the duty of the PWM signal may be 100% (1), which is the local dimming value.

The controller 170 may adjust the constant current of the backlight block based on the global dimming value.

The controller 170 may adjust the amplitude of the PWM signal based on the global dimming value. For example, the controller 170 may determine the constant current based on the global dimming value and may adjust the amplitude of the PWM signal so that the constant current is provided to the backlight block.

In one embodiment, the controller 170 may obtain a new constant current value by multiplying the existing constant current value by the global dimming value.

That is, when the global dimming value is 50%, the controller 170 may adjust the constant current flowing through the light source from A1 to A1/2.

In (b) of FIG. 15, the constant current value provided to the backlight block or the light source of the backlight block may be A1/2.

Referring to (b) of FIG. 15, a third graph 1531 may be a graph showing the relationship between gray level and current when the driving frequency of the PWM signal is 120 Hz, and a fourth graph 1533 may be a graph showing the relationship between gray level and current when the driving frequency of the PWM signal is 480 Hz.

In the second graph 1513 according to the prior art, the gray level expression was reduced to 512 gray level, but in the fourth graph 1533 according to the embodiment of the present disclosure, it may be confirmed that the gray level is maintained at 1024 because the global dimming value was not reflected in the duty of the PWM signal.

As such, according to an embodiment of the present disclosure, even if the driving frequency of the PWM signal is increased to prevent red afterimage that occur due to the use of the KSF phosphor, the gray level expression may be prevented from being reduced by the global dimming value.

Figure 16:
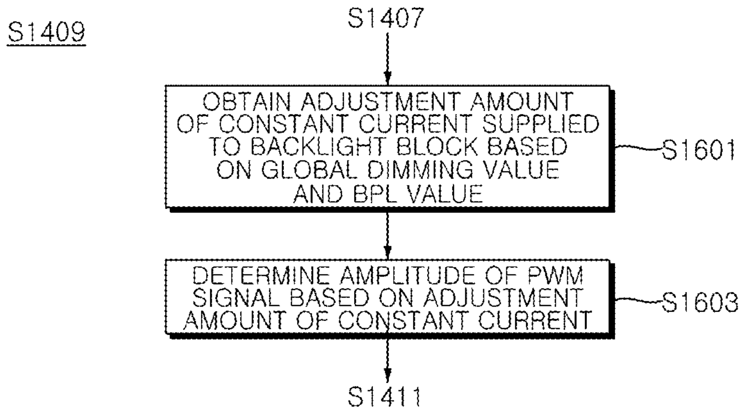
FIG. 16 is a diagram illustrating an embodiment of adjusting the constant current supplied to the backlight block based on the global dimming value and the Boost Peak Luminance (BPL) value after applying the local dimming value as the duty of the PWM signal.

FIG. 16 is a diagram illustrating an embodiment of adjusting the constant current supplied to the backlight block based on the global dimming value and the Boost Peak Luminance (BPL) value after applying the local dimming value as the duty of the PWM signal.

FIG. 16 may be an embodiment embodying step S1407 of FIG. 14.

Referring to FIG. 16, the controller 170 may obtain an adjustment amount of the constant current supplied to the backlight block based on the global dimming value and the BPL value (S1601).

The BPL algorithm may be an algorithm that increases luminance by collectively increasing the current flowing through each of the plurality of backlight blocks when the average of local dimming values of the plurality of backlight blocks decreases.

The BPL value may be a current value to be increased determined according to the BPL algorithm or a current ratio corresponding to the current value to be increased.

The controller 170 may obtain the product of the global dimming value and the BPL value as a constant increase in current.

For example, if the global dimming value is 50% and the BPL value is 220%, the increase in constant current may be 110% ($1.1=0.5\times2.2$).

The controller 170 may determine the amplitude of the PWM signal based on the adjustment amount of the constant current (S1603).

The controller 170 may increase the amplitude of the PWM signal according to the adjustment amount of the constant current. For example, when the increase in the constant current supplied to the backlight block is 110%, the controller 170 may increase the amplitude of the PWM signal to provide a corresponding constant current.

As such, the display device 100 according to an embodiment of the present disclosure may determine the duty of the PWM signal based on the local dimming value and determine the amplitude of the PWM signal based on the global dimming value and the BPL value.

Accordingly, even if the driving frequency of the PWM signal increases due to the application of the KSF phosphor, the duty of the PWM signal is maintained so that gray level expression may be maintained, and the global dimming value and BPL value may be applied to the constant current to maintain a contrast ratio of the image.

Figure 17:
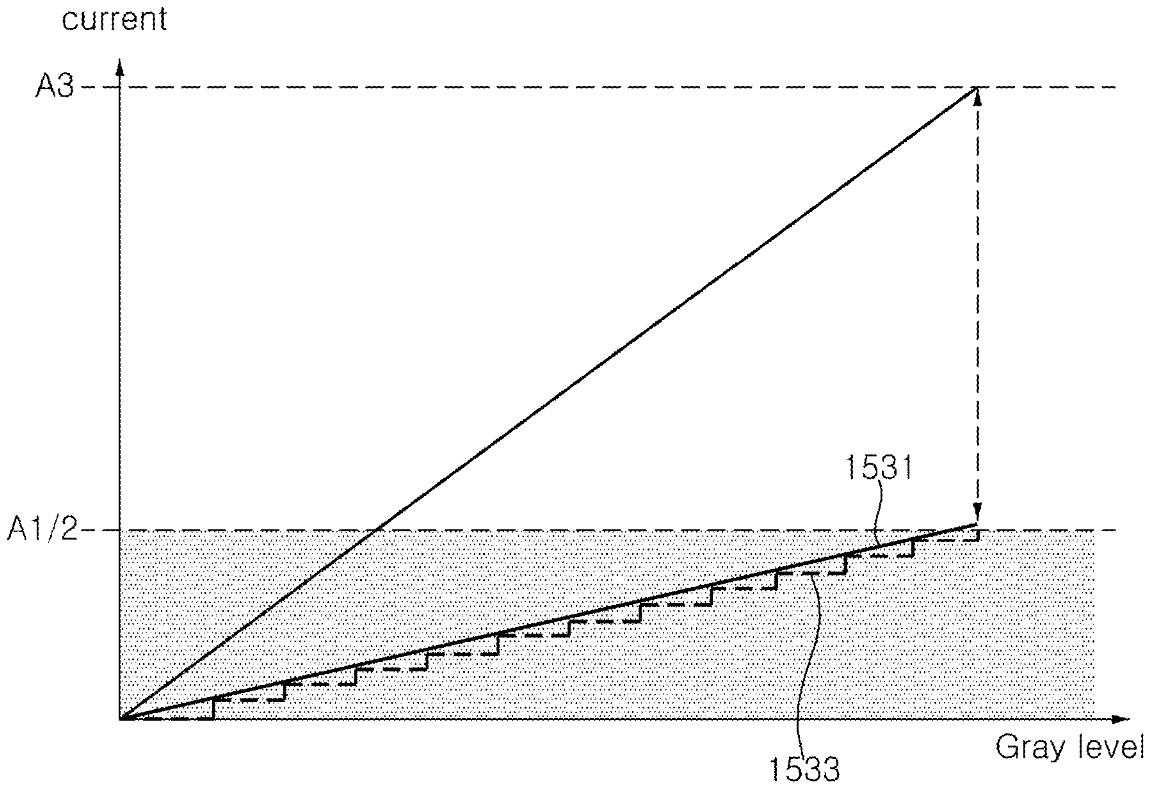
FIG. 17 is a diagram illustrating an example in which a constant current is applied based on a global dimming value and a BPL value according to an embodiment of the present disclosure.

FIG. 17 is a diagram illustrating an example in which a constant current is applied based on a global dimming value and a BPL value according to an embodiment of the present disclosure.

In FIG. 17, the third graph 1531 and the fourth graph 1533 used in FIG. 15 are shown.

In the fourth graph 1533, the constant current of the backlight block is set to A1/2, but the constant current of the backlight block may be adjusted to A3 according to the application of the global dimming value and BPL value.

Figure 18A:
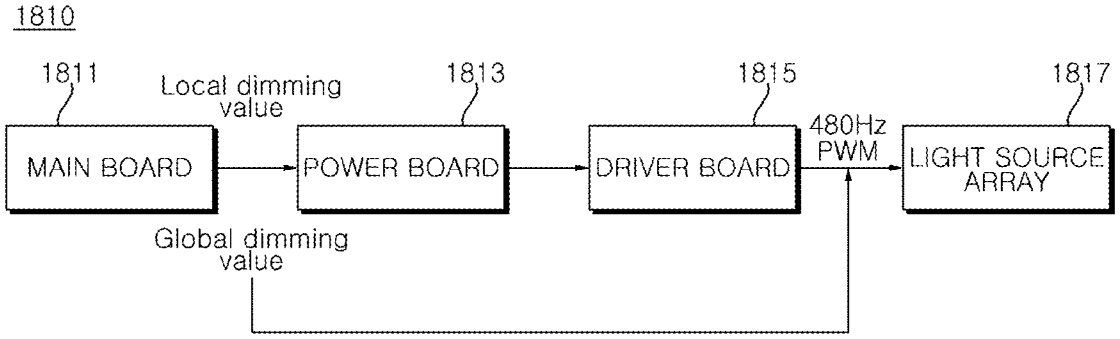
FIGS. 18A and 18B are diagrams illustrating the configuration of a display device according to another embodiment of the present disclosure.
Figure 18B:
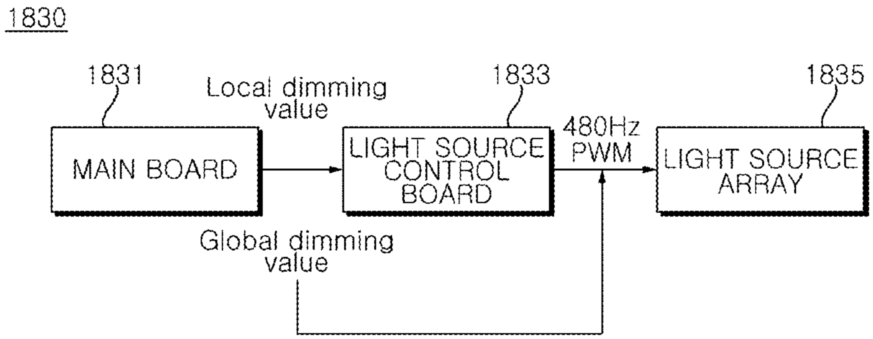

FIGS. 18A and 18B are diagrams illustrating the configuration of a display device according to another embodiment of the present disclosure.

In particular, FIG. 18A is a block diagram illustrating the configuration of a display device 1810 with a direct backlight, and FIG. 18B is a block diagram illustrating the configuration of a display device 1830 with an edge-type backlight.

Referring to FIG. 18A, the display device 1810 may include a main board 1811, a power board 1813, a driver board 1815, and a light source array 1817.

The main board 1811 may perform the function of the controller 170.

The main board 1811 may obtain the driving frequency of the PWM signal for driving the backlight block B1 of the backlight 250.

The main board 1811 may obtain global dimming value and local dimming value.

The global dimming value may have any value from 0 to 100. The unit of the global dimming value may be %.

The main board 1811 may obtain a plurality of local dimming values corresponding to each of the plurality of backlight blocks.

The main board 1811 may determine whether the obtained global dimming value is less than a certain value.

If the global dimming value is less than the certain value, the main board 1811 may determine the local dimming value as the duty of the PWM signal.

The main board 1811 may determine the amplitude of the PWM signal based on the global dimming value. The main board 1811 may adjust the constant current provided to the backlight block based on the global dimming value. If the global dimming value is less than the certain value, the main board 1811 may reduce the constant current provided to the backlight block to be linked to the global dimming value. The controller 170 may determine the reduced constant current as the amplitude of the PWM signal.

The power board 1813 may apply the determined duty, amplitude, and power to generate the corresponding PWM signal to the driver board 1815.

The driver board 1815 may receive the determined duty and amplitude from the main board 1811.

The driver board 1815 may generate a PWM signal based on the duty of the PWM signal received from the power board 1813, the amplitude of the PWM signal, and the power. The driving frequency of the PWM signal may be 480 Hz, but this is only an example.

The light source array 1817 may include a plurality of light sources. The light source array 1817 may be composed of a plurality of light source arrays 1817 to form a backlight.

The light source array 1817 may be referred to as a backlight block.

Referring to FIG. 18B, a display device 1830 according to another embodiment of the present disclosure may include a main board 1831, a light source control board 1833, and a light source array 1835.

The main board 1831 may perform the function of the controller 170.

The main board 1831 may perform the same function as the main board 1811 of FIG. 18A.

The light source control board 1833 may generate a corresponding PWM signal with a determined duty and amplitude and apply the generated PWM signal to the light source array 1835.

The driving frequency of the PWM signal may be 480 Hz, but this is only an example.

The light source array 1835 may include a plurality of light sources. The light source array 1835 may be composed of a plurality of light source arrays 1835 to form a backlight.

The light source array 1835 may be referred to as a backlight block.

According to an embodiment of the present disclosure, the controller 170 of the display device 100 may obtain the driving frequency of the PWM signal for driving the backlight block B1 of the backlight 250.

In one embodiment, the controller 170 may determine whether the image to be displayed on the panel 210 is a still image or a moving image based on the image data transmitted to the panel 210.

The controller 170 may extract a motion vector for each of a previous frame and a current frame following the previous frame, and compare the extracted motion vectors to determine whether the image to be displayed on the panel 210 is a still image or a moving image.

When the image to be displayed on the panel 210 is a video, the controller 170 may increase the driving frequency of the PWM signal from the first driving frequency to the second driving frequency.

In one embodiment, the first driving frequency may be an initial driving frequency of 120 Hz, but this is only an example. This is because when a still image is displayed, the probability of a red afterimage occurring due to the KSF phosphor is low, and when a moving image is displayed, the probability of a red afterimage occurring due to the KSF phosphor is high.

When the image to be displayed on the panel 210 is the moving image, the controller 170 may obtain an increased driving frequency of the PWM signal.

If the global dimming value is less than the certain value and the driving frequency of the PWM signal is increased than an initial driving frequency, the controller 170 may determine the local dimming value as the duty of the PWM signal. That is, if the driving frequency of the PWM signal is increased than the initial driving frequency, the image to be displayed on the panel 210 may be recognized as the moving image. If the image to be displayed on the panel 210 is the moving image, there is a high probability that a red afterimage will occur due to the KSF phosphor.

Accordingly, in an embodiment of the present disclosure, when the global dimming value is less than the certain value and the image to be displayed on the panel 210 is the moving image, only the local dimming value is determined as the duty of the PWM signal, thereby improving gray level expression.

A display device 100 according to an embodiment of the present disclosure, may comprise a liquid crystal display panel 210; a backlight 250 configured to output a light to the liquid crystal display panel, wherein the backlight includes a plurality of backlight blocks and a light source driving circuit 256 configured to generate a light source driving signal for controlling a light output of the backlight block, each backlight block has one or more LEDs (Light Emitting Diodes); and each LED is formed of KSF (Potassium fluorosilicate) phosphor: and a controller configured to: obtain a global dimming value and a local dimming value, determine a duty of the light source driving signal as the local dimming value if the global dimming value is less than a certain value, and reduce a constant current applied to the backlight block based on the global dimming value.

The controller 170 may reduce the constant current to be proportional to the global dimming value.

The controller 170 may adjust an amplitude of the light source driving signal to correspond to the reduced constant current.

The controller 170 may transmit the determined duty and the adjusted amplitude to the light source driving circuit 256, the light source driving circuit 256 may generate the light source driving signal with the determined duty and the adjusted amplitude, and transmit the generated light source driving signal to the backlight block.

The controller 170 may adjust the constant current based on the global dimming value and a boost peak luminance value.

The controller 170 may determine the duty of the light source driving signal as the local dimming value when the global dimming value is less than the certain value and the image to be displayed on the liquid crystal display panel is a moving image.

The controller 170 may determine a product of the global dimming value and the local dimming value as the local dimming value when the global dimming value is the certain value.

The backlight may be either a direct-type backlight or an edge-type backlight.

The global dimming value may be within a range of 0 to 100, the certain value may be 100.

The light source driving signal may be a Pulse Width Modulation (PWM) signal.

The present disclosure described above may be implemented as computer-readable code on a program-recorded medium. Computer-readable media includes all types of recording devices that store data that may be read by a computer system. Examples of computer-readable media include HDD (Hard Disk Drive), SSD (Solid State Disk), SDD (Silicon Disk Drive), ROM, RAM, CD-ROM, magnetic tape, floppy disk, and optical data storage devices. Additionally, the computer may include a controller 170 of the display device 100. Accordingly, the above detailed description should not be construed as restrictive in all respects and should be considered illustrative.

What is claimed is:

1. A display device, comprising:

a liquid crystal display panel;

a backlight configured to output a light to the liquid crystal display panel, wherein the backlight includes a plurality of backlight blocks and a light source driving circuit configured to generate a light source driving signal for controlling a light output of the backlight block, each backlight block has one or more LEDs (Light Emitting Diodes); and each LED comprises KSF (Potassium fluorosilicate) phosphor; and a controller configured to:

obtain a global dimming value and a local dimming value, and if the global dimming value is less than a certain value, determine a duty of the light source driving signal as the local dimming value, and reduce a constant current, which corresponds to an amplitude of the light source driving signal, applied to the backlight block based on the global dimming value, wherein the controller is configured to determine a product of the global dimming value and the local dimming value as the local dimming value when the global dimming value is the certain value.

2. The display device of claim 1, wherein the controller is configured to reduce the constant current to be proportional to the global dimming value.

3. The display device of claim 1, wherein the controller is further configured to adjust the amplitude of the light source driving signal to correspond to the reduced constant current.

4. The display device of claim 3, wherein the controller is further configured to transmit the determined duty and the adjusted amplitude to the light source driving circuit, wherein the light source driving circuit is configured to:

generate the light source driving signal with the determined duty and the adjusted amplitude, and transmit the generated light source driving signal to the backlight block.

5. The display device of claim 1, wherein the controller is further configured to adjust the constant current based on the global dimming value and a boost peak luminance value.

6. The display device of claim 1, wherein the controller is configured to determine the duty of the light source driving signal as the local dimming value when the global dimming value is less than the certain value and the image to be displayed on the liquid crystal display panel is a moving image.

7. The display device of claim 1, wherein the backlight is either a direct-type backlight or an edge-type backlight.

8. The display device of claim 1, wherein the global dimming value is within a range of 0 to 100, the certain value is 100.

9. The display device of claim 1, wherein the light source driving signal is a Pulse Width Modulation (PWM) signal.

10. An operating method of a display device, wherein the display device includes a liquid crystal display panel; a backlight configured to output a light to the liquid crystal display panel, wherein the backlight includes a plurality of backlight blocks and a light source driving circuit configured to generate a light source driving signal for controlling a light output of the backlight block, each backlight block has one or more LEDs (Light Emitting Diodes) and each LED comprises KSF (Potassium fluorosilicate) phosphor, the operation method comprising:

obtaining a global dimming value and a local dimming value;

if the global dimming value is less than a certain value, determining a duty of the light source driving signal as the local dimming value; and reducing a constant current, which corresponds to an amplitude of the light source driving signal, applied to the backlight block based on the global dimming value; and determining a product of the global dimming value and the local dimming value as the local dimming value when the global dimming value is the certain value.

11. The operating method of claim 10, wherein the step of reducing the constant current comprises:

reducing the constant current to be proportional to the global dimming value.

12. The operating method of claim 10, further comprising:

adjusting the amplitude of the light source driving signal to correspond to the reduced constant current.

13. The operating method of claim 12, further comprising:

transmitting the determined duty and the adjusted amplitude to the light source driving circuit;

generating the light source driving signal with the determined duty and the adjusted amplitude; and transmitting the generated light source driving signal to the backlight block.

14. The operating method of claim 10, further comprising:

adjusting the constant current based on the global dimming value and a boost peak luminance value.

15. The operating method of claim 10, wherein the determining step comprises:

determining the duty of the light source driving signal as the local dimming value when the global dimming value is less than the certain value and the image to be displayed on the liquid crystal display panel is a moving image.

16. The operating method of claim 10, wherein the backlight is either a direct-type backlight or an edge-type backlight.

17. The operating method of claim 10, wherein the global dimming value is within a range of 0 to 100, the certain value is 100.

18. The operating method of claim 10, wherein the light source driving signal is a Pulse Width Modulation (PWM) signal.

* * * * *